US007958117B2

(12) United States Patent
Pettinati et al.

(10) Patent No.: US 7,958,117 B2
(45) Date of Patent: Jun. 7, 2011

(54) INITIAL IMPRESSION ANALYSIS TOOL FOR AN ONLINE DATING SERVICE

(75) Inventors: Lucas Visvikis Pettinati, San Jose, CA (US); Hillary A. Carey, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 229 days.

(21) Appl. No.: 11/561,254

(22) Filed: Nov. 17, 2006

(65) Prior Publication Data

US 2008/0120277 A1 May 22, 2008

(51) Int. Cl.
*G06F 17/30* (2006.01)

(52) U.S. Cl. ............................................ 707/732; 705/1

(58) Field of Classification Search .................. 707/1, 3, 707/5–6, 9–10, 732, 733, 734; 709/203, 709/218; 705/1, 7
See application file for complete search history.

(56) References Cited

U.S. PATENT DOCUMENTS

| | | | | |
|---|---|---|---|---|
| 5,086,394 | A | 2/1992 | Shapira | |
| 5,681,046 | A * | 10/1997 | Lawrence | 273/459 |
| 5,835,087 | A | 11/1998 | Herz et al. | |
| 5,950,193 | A | 9/1999 | Kulkarni | |
| 5,950,200 | A | 9/1999 | Sudai et al. | |
| 5,963,951 | A * | 10/1999 | Collins | 707/102 |
| 5,996,006 | A | 11/1999 | Speicher | |
| 6,029,141 | A | 2/2000 | Bezos et al. | |
| 6,052,122 | A * | 4/2000 | Sutcliffe et al. | 715/751 |
| 6,061,681 | A * | 5/2000 | Collins | 707/5 |
| 6,064,967 | A | 5/2000 | Speicher | |
| 6,129,141 | A | 10/2000 | Yang et al. | |
| 6,175,831 | B1 * | 1/2001 | Weinreich et al. | 1/1 |
| 6,243,375 | B1 | 6/2001 | Speicher | |
| 6,249,282 | B1 * | 6/2001 | Sutcliffe et al. | 715/751 |
| 6,269,369 | B1 | 7/2001 | Robertson | |

(Continued)

FOREIGN PATENT DOCUMENTS

CA 2 455 342 A1 6/2004

(Continued)

OTHER PUBLICATIONS friendster.com.*

(Continued)

*Primary Examiner* — Don Wong
*Assistant Examiner* — Sheree N Brown
(74) *Attorney, Agent, or Firm* — Frommer Lawrence & Haug LLP; Jamie L. Wiegand

(57) ABSTRACT

A system and method are directed towards managing a display of initial impression attributes to bring the most relevant information into quick view. The view can be customized by the user. Within a search context, a search may be performed based on a set of search criteria. The user may establish a set of initial impression attributes to be displayed, or employ a default set of initial impression attributes. The default set may be determined based on statistical analysis. When a result of the search is displayed, the initial impression attributes may also be displayed such that the user may review the initial impression attributes and make a decision based, in part, on the initial impression attributes. Initial impression attributes may also be employed within threaded online conversations or browsing through inventory. The search or browse contexts may include online dating searches, merchandises searches, groups, real estate, even employment searches.

20 Claims, 7 Drawing Sheets

U.S. PATENT DOCUMENTS 6,272,467 B1 * 8/2001 Durand et al. .................... 705/1
6,282,515 B1 8/2001 Speicher
6,285,984 B1 9/2001 Speicher
6,296,369 B1 10/2001 Liao
6,324,541 B1 11/2001 de l'Etraz et al.
6,327,573 B1 12/2001 Walker et al.
6,356,879 B2 3/2002 Aggarwal et al.
6,433,795 B1 8/2002 MacNaughton et al.
6,449,344 B1 9/2002 Goldfinger et al.
6,466,917 B1 10/2002 Goyal et al.
6,473,751 B1 * 10/2002 Nikolovska et al. .............. 707/3
6,502,077 B1 12/2002 Speicher
6,606,657 B1 8/2003 Zilberstein et al.
6,665,389 B1 12/2003 Haste, III
6,681,247 B1 1/2004 Payton
6,697,786 B2 2/2004 Speicher
6,714,931 B1 3/2004 Papierniak et al.
6,735,568 B1 5/2004 Buckwalter et al.
6,745,178 B1 6/2004 Emens et al.
6,836,762 B2 12/2004 Speicher
6,879,994 B1 4/2005 Matsliach et al.
6,993,325 B1 1/2006 Waesterlid
7,069,308 B2 * 6/2006 Abrams ........................ 709/218
7,080,117 B2 7/2006 de Pinto et al.
7,117,254 B2 * 10/2006 Lunt et al. ..................... 709/218
7,143,052 B2 11/2006 LaSalle et al.
7,188,153 B2 * 3/2007 Lunt et al. ..................... 709/218
7,200,638 B2 4/2007 Lake
7,203,674 B2 * 4/2007 Cohen ............................... 707/3
7,454,357 B2 * 11/2008 Buckwalter et al. .......... 705/346
7,512,653 B2 3/2009 Krishnasamy et al.
7,592,910 B2 * 9/2009 Tuck et al. ............... 340/539.13
7,599,935 B2 * 10/2009 La Rotonda et al. ................. 1/1
7,613,706 B2 * 11/2009 Terrill et al. .......................... 1/1
7,676,466 B2 * 3/2010 Terrill et al. ........... 707/999.006
7,707,122 B2 * 4/2010 Hull et al. ..................... 705/319
7,788,260 B2 * 8/2010 Lunt et al. ..................... 707/727
2001/0032245 A1 10/2001 Fodor
2002/0023132 A1 2/2002 Tornabene et al.
2002/0023230 A1 2/2002 Bolnick et al.
2002/0040310 A1 * 4/2002 Lieben et al. ..................... 705/7
2002/0049616 A1 4/2002 Speicher
2002/0059201 A1 5/2002 Work
2002/0099806 A1 7/2002 Balsamo et al.
2002/0103797 A1 8/2002 Goel et al.
2002/0107242 A1 8/2002 Sabb et al.
2002/0116458 A1 * 8/2002 Bricklin et al. ............... 709/204
2002/0116466 A1 8/2002 Trevithick et al.
2002/0124053 A1 9/2002 Adams et al.
2002/0178163 A1 11/2002 Mayer
2003/0037114 A1 2/2003 Nishio et al.
2003/0050977 A1 3/2003 Puthenkulam et al.
2003/0074440 A1 4/2003 Grabarnik et al.
2003/0093405 A1 5/2003 Mayer
2003/0105827 A1 6/2003 Tan et al.
2003/0135412 A1 7/2003 Speicher
2003/0158855 A1 8/2003 Farnham et al.
2003/0167324 A1 9/2003 Farnham et al.
2003/0191673 A1 * 10/2003 Cohen ............................... 705/5
2003/0200217 A1 * 10/2003 Ackerman ........................ 707/9
2003/0220980 A1 * 11/2003 Crane ........................... 709/207
2003/0231207 A1 12/2003 Huang
2004/0010484 A1 1/2004 Foulger et al.
2004/0044536 A1 3/2004 Fitzpatrick et al.
2004/0048605 A1 * 3/2004 Schaefer et al. ........... 455/414.2
2004/0088315 A1 5/2004 Elder et al.
2004/0088322 A1 5/2004 Elder et al.
2004/0088325 A1 5/2004 Elder et al.
2004/0103203 A1 5/2004 Nichols et al.
2004/0107242 A1 6/2004 Vert et al.
2004/0119760 A1 6/2004 Grossman et al.
2004/0122681 A1 6/2004 Ruvolo et al.
2004/0122803 A1 6/2004 Dom et al.
2004/0122810 A1 6/2004 Mayer
2004/0122855 A1 6/2004 Ruvolo et al.
2004/0133440 A1 7/2004 Carolan et al.
2004/0148275 A1 7/2004 Achlioptas
2004/0153514 A1 * 8/2004 Crane ........................... 709/206
2004/0167794 A1 * 8/2004 Shostack et al. .................. 705/1
2004/0177120 A1 9/2004 Kirsch
2004/0199765 A1 10/2004 Kohane et al.
2004/0210661 A1 10/2004 Thompson
2004/0215648 A1 10/2004 Marshall et al.
2004/0215793 A1 10/2004 Ryan et al.
2004/0249811 A1 * 12/2004 Shostack et al. .................. 707/5
2004/0260781 A1 * 12/2004 Shostack et al. .............. 709/207
2004/0260792 A1 12/2004 Speicher
2005/0015432 A1 1/2005 Cohen
2005/0015455 A1 1/2005 Liu
2005/0021750 A1 * 1/2005 Abrams ........................ 709/225
2005/0076003 A1 * 4/2005 DuBose et al. ................... 707/1
2005/0076021 A1 4/2005 Wu et al.
2005/0083906 A1 4/2005 Speicher
2005/0125408 A1 6/2005 Somaroo et al.
2005/0197846 A1 * 9/2005 Pezaris et al. ..................... 705/1
2005/0209861 A1 9/2005 Hewes et al.
2005/0216300 A1 9/2005 Appelman et al.
2005/0235062 A1 * 10/2005 Lunt et al. ..................... 709/225
2006/0031121 A1 2/2006 Speicher
2006/0059130 A1 3/2006 Weiss et al.
2006/0059142 A1 * 3/2006 Zvinyatskovsky et al. ....... 707/5
2006/0059159 A1 * 3/2006 Truong et al. ................... 707/10
2006/0080121 A1 4/2006 Chiang
2006/0155566 A1 * 7/2006 Berger .............................. 705/1
2006/0218153 A1 9/2006 Voon et al.
2006/0242128 A1 10/2006 Goel
2007/0027921 A1 2/2007 Alvarado et al.
2007/0031800 A1 * 2/2007 Solomon ....................... 434/322
2007/0069901 A1 * 3/2007 Tuck et al. ................. 340/573.1
2007/0073802 A1 * 3/2007 Terrill et al. .................. 709/203
2007/0132780 A1 * 6/2007 Garbow et al. ............... 345/619
2007/0136745 A1 * 6/2007 Garbow et al. ................. 725/34
2008/0133716 A1 * 6/2008 Rao et al. ...................... 709/220

FOREIGN PATENT DOCUMENTS

JP 2004-272423 9/2004

OTHER PUBLICATIONS orkut.com.*
eharmony.com.*
facebook.com.*
match.com.*
hotornot.com.*
myspace.com.*
cybersuitors.com.*
International Search Report and Written Opinion, mailed Oct. 29, 2007 for International Patent Application PCT/US2007/070525 filed on Jun. 6, 2007.
Hallett, Vicky, "Shopping: Bagging the Best Deals Online", U.S. News & World Report, Nov. 12, 2006, (2 pages), http://www.usnews.com/usnews/biztech/articles/061112/20sites.shopping.htm (accessed May 17, 2007).
Tedeschi, Bob, "Filling a gap online, shoe sales shine", International Herald Tribune, Oct. 23, 2006, (2 pages), http://iht.com/articles/2006/10/23/business/ecom.php, (accessed May 17, 2007).
Dragan, R.V., "Tribe.net (beta)," PC Magazine, <http//:www.pcmag.com/article2/0,1759,1418688,00.asp>, Jan. 20, 2004.
Mullaney, T.J., "Diller's Latest Little Bet on the Net", BusinessWeek Online, <http://www.businessweek.com/print/technology/content/mar2004/tc20004031_2820_tc119.h...>, Mar. 1, 2004.
"FAQs About the ZeroDegrees Service," visited on Sep. 8, 2004, <http://www.zerodegrees.com/faq.htm>.
MetricStream, Enterprise Quality and Compliance Management Solutions, "Zaplet Technology within MetricStream" visited on Sep. 16, 2005.
Gmail, "About Gmail," visited on Sep. 16, 2005, <http://mail.google.com/mail/help/about.html>.
True U, "Using True," visited on Sep. 16, 2005, <www.true.com/magazine/true_coach_summertips_part9.htm>.
AmericanSingles.com, "Learn More About AmericanSingles.com," visited on Sep. 16, 2005, <www.americansingles.com/default.asp?p=13010&CategoryID=62.

Notification of Transmittal of the International Search Report and the Written Opinion of the International Searching Authority, or the Declaration (11 pages).
International Search Report dated Oct. 24, 2006, for International Application PCT/US05/31142, filed Aug. 31, 2005.
Hines, M., "AOL serves up software for BREW", <http://news.com.com/2100-1038-5117686.html>, Dec. 9, 2003.
Hines, M., "America Online proposes Love.com," <http://news.com.com/2100-1032-5118986.html>, Dec. 10, 2003.
Ken Jordan et al., "The Augmented Social Network: Building identity and trust into the next-generation internet," First Monday Peer-Reviewed Journal on the Internet, (Jul. 2003) <http://www.firstmonday.dk/issues/issue8_8/jordan/>.
Cranor, L. F. et al., "Spam," Communications of the ACM, 41(8):74-83, Aug. 1998.
"Welcome to the Christian Connection Matchmaker", http://web.archive.org/web/19990221092342/www.christian.matchmaker.com/main, Feb. 21, 1999.
"The Purpose Principles and Process", http://web.archive.org/web/19990224045035/www.christian.matchmaker.com/process, Feb. 24, 1999.
"A Sneak Preview of the Christian Connection Matchmaker Search Page", http://web.archive.org/web/19990508232314/www.christian.matchmaker.com/ppsearch, May 8, 1999.
"A Sneak Preview of the Christian Connection Matchmaker Match Page", archive.org website of www.christian.matchmaker.com, Feb. 23, 1999.
"Yahoo! Groups—What is a Group?", http://web.archive.org/web/20021103223155/www.yahoo.com/r/ub, Nov. 3, 2002.
"Yahoo! Groups—Getting Started, Groups Account, Groups Features", http://web.archive.org/web/20021017061719/http://help.yahoo.com/help/groups, Oct. 17, 2002.
"Yahoo! Groups—What is the spam policy in Yahoo! Groups? How do I avoid spam?", http://web.archive.org/web/20021024130230/help.yahoo.com/help/us/groups/groups-05.html, Oct. 24, 2002.
Merrick, A., "The Best Way to . . . Find a Date—OK, so true love isn't guaranteed; But there are ways to better the odds", Wall Street Journal, New York, NY, p. 1-5, ProQuest ID 64669169, Nov. 27, 2000.
Member site Selection Page for Matchmaker.com, http://web.archive.org/web/19990219183131/matchmaker.com/newtry.shtml, Feb. 19, 1999.
"Welcome to the Christian Connection Matchmaker," http://web.archive.org/web/19990222170152/http://www.Christian.email.net/index/html, Feb. 22, 1999.
Matchmaker.com Disclaimer, http://web.archive.org/web/20000420114350/www.Christian.matchmaker.com/rules, Apr. 20, 2000.
Written Opinion of the International Searching Authority, mailed Oct. 3, 2006 for International Patent Application PCT/US04/38696 filed on Nov. 17, 2004, 5 pages.
International Preliminary Report on Patentability dated Dec. 14, 2006 issued for corresponding International Patent Application No. PCT/US2004/038703.
"System Names and Numbers," archive.org website of www.christian.matchmaker.com, Apr. 24, 1999.
"Matchmaker User Tools Pages," archive.org website of www.christian.matchmaker.com, Apr. 24, 1999, pp. 1-2.
"Matchmaker Help—Block," archive.org website of www.christian.matchmaker.com, Sep. 10, 1999, p. 1.
"Matchmaker Help—Main Page," archive.org website of www.christian.matchmaker.com, Oct. 4, 1999, p. 1-3.
International Search Report dated Jul. 7, 2005, from International Application No. PCT/US04/38704.
U.S. Appl. No. 10/832,172, Official Communication mailed May 16, 2007.
U.S. Appl. No. 10/832,172, Official Communication mailed Feb. 9, 2007.
U.S. Appl. No. 10/832,172, Official Communication mailed Aug. 23, 2006.
U.S. Appl. No. 10/946,636, Official Communication mailed Feb. 21, 2007.
U.S. Appl. No. 10/946,636, Official Communication mailed Aug. 29, 2006.
U.S. Appl. No. 10/946,630, Official Communication mailed Jul. 27, 2007.
U.S. Appl. No. 10/946,630, Official Communication mailed May 2, 2007.
U.S. Appl. No. 10/946,630, Official Communication mailed Feb. 6, 2007.
U.S. Appl. No. 10/946,630, Official Communication mailed Aug. 16, 2006.
U.S. Appl. No. 10/866,954, Official Communication mailed Aug. 8, 2007.
U.S. Appl. No. 10/866,954, Official Communication mailed Feb. 23, 2007.
U.S. Appl. No. 10/866,954, Official Communication mailed Jul. 26, 2006.
U.S. Appl. No. 10/866,954, Official Communication mailed Feb. 1, 2006.
U.S. Appl. No. 10/866,954, Official Communication mailed Mar. 16, 2005.
U.S. Appl. No. 11/314,201, Official Communication mailed May 17, 2007.
U.S. Appl. No. 10/863,926, Official Communication mailed Jun. 26, 2007.
U.S. Appl. No. 10/863,926, Official Communication mailed Dec. 29, 2006.
U.S. Appl. No. 10/863,926, Official Communication mailed Aug. 14, 2006.
U.S. Appl. No. 10/863,926, Official Communication mailed Feb. 28, 2006.
U.S. Appl. No. 10/863,926, Official Communication mailed Sep. 9, 2005.
U.S. Appl. No. 10/863,926, Official Communication mailed Apr. 6, 2005.
U.S. Appl. No. 10/946,636, Official Communication mailed Jul. 27, 2007.
A Sneak Preview of the Christian Connection Matchmaker Who's on Page archive.org website of www.christian.matchrnaker.com (accessed Feb. 24, 1999).
Design Center Tutorial: Preview and http://www.adobe.com/designcenter/dreamweave/larticles/drw8at_testserver.html (accessed Sep. 2, 2008).
Ethier, R., "Current Research in Social Network Theory," 10 pages, Dec. 10, 2003 http://upaya.soc.neu.edu/archive/students/Ethier-SocialNetworks.html.
MatchMaker Help Pages—Frequently (accessed Feb. 15, 2007) Asked Questions, 7 pgs., archive.org website of www.christian.matchmaker.com (accessed Feb. 15, 2007).
Moore, K. A, et al., "The Law and Economics of Survivor", Copyright 2000, George Mason University School of Law, pp. 1-39.
The Matchmaker Network Systems Page, System Names and Numbers, 3 pages, http://web.archive.org/web/19990424123143/www.christian.matchmaker.com/systems (accessed Feb. 15, 2007).
The Official America Online for Windows Tour Guide, Second Edition, Copyright 1994, Tom Lichty, pp. 239-256.
Tiwana, A, et al., "A Social Exchange Architecture for Distributed Web Communities", 2001, Journal of Knowledge Management, 5, 3, ABI/INFORM Global, pp. 242-248.
Welcome to My Yahoo!, 2 pgs, archive.org website of www.yahoo.com/r/il (accessed Feb. 15, 2007).
Office Communication for U.S. Appl. No. 10/832,172, mailed Jun. 18, 2007.
Office Communication for U.S. Appl. No. 10/863,926, mailed Dec. 17, 2007.
Office Communication for U.S. Appl. No. 10/863,926, mailed Apr. 16, 2008.
Office Communication for U.S. Appl. No. 10/863,926, mailed Aug. 1, 2008.
Office Communication for U.S. Appl. No. 10/863,926, mailed Jan. 12, 2009.
Office Communication for U.S. Appl. No. 10/863,926, mailed Apr. 1, 2009.
Office Communication for U.S. Appl. No. 10/863,926, mailed May 14, 2009.

Office Communication for U.S. Appl. No. 10/863,926, mailed Sep. 29, 2009.
Office Communication for U.S. Appl. No. 10/663,926, mailed Dec. 8, 2009.
Office Communication for U.S. Appl. No. 10/863,926, mailed Feb. 16, 2010.
Office Communication for U.S. Appl. No. 10/863,926, mailed Jun. 17, 2010.
Office Communication for U.S. Appl. No. 10/863,926, mailed Dec. 6, 2010.
Office Communication for U.S. Appl. No. 10/866, 954, mailed Aug. 18, 2005.
Office Communication for U.S. Appl. No. 10/866,954, mailed Jan. 8, 2008.
Office Communication for U.S. Appl. No. 10/866,954, mailed Aug. 25, 2008.
Office Communication for U.S. Appl. No. 10/866,954, mailed Nov. 7, 2008.
Office Communication for U.S. Appl. No. 101866,954, mailed Feb. 20, 2009.
Office Communication for U.S. Appl. No. 10/866,954, mailed Sep. 2, 2009.
Office Communication for U.S. Appl. No. 10/866,954, mailed Nov. 16, 2009.
Office Communication for U.S. Appl. No. 10/946,630, mailed Jan. 29, 2008.
Office Communication for U.S. Appl. No. 10/946,630, mailed May 28, 2008.
Office Communication for U.S. Appl. No. 10/946,630, mailed Oct. 16, 2008.
Office Communication for U.S. Appl. No. 10/946,630, mailed Mar. 10, 2009.
Office Communication for U.S. Appl. No. 10/946,630, mailed Jun. 12, 2009.
Office Communication for U.S. Appl. No. 10/946,630, mailed Oct. 26, 2009 Ii.
Office Communication for U.S. Appl. No. 10/946,630, mailed Feb. 5, 2010.
Office Communication for U.S. Appl. No. 10/946,636, mailed Dec. 13, 2007.
Office Communication for U.S. Appl. No. 10/946,636, mailed Jun. 20, 2008.
Office Communication for U.S. Appl. No. 10/946,636, mailed Sep. 17, 2008.
Office Communication for U.S. Appl. No. 10/946,636, mailed Feb. 9, 2009.
Office Communication for U.S. Appl. No. 10/946,636, mailed Sep. 1, 2009.
Office Communication for U.S. Appl. No. 10/946,636, mailed Dec. 29, 2009.
Office Communication for U.S. Appl. No. 11/314,201, mailed Nov. 1, 2007.
Office Communication for U.S. Appl. No. 11/314,201, mailed Dec. 8, 2008.
Office Communication for U.S. Appl. No. 11/314,206, mailed Jul. 9, 2009.
Office Communication for U.S. Appl. No. 11/392,247, mailed Mar. 3, 2008.
Office Communication for U.S. Appl. No. 11/392,247, mailed Nov. 4, 2008.
Office Communication for U.S. Appl. No. 11/392,247, mailed Apr. 16, 2009.
Office Communication for U.S. Appl. No. 11/392,247, mailed Nov. 23, 2009.
International Preliminary Report on Patentability for International Patent Application No. PCT/US2004/038696, mailed Nov. 2, 2006.
International Preliminary Report on Patentability for International Patent Application No. PCT/US2004/038704, mailed Aug. 10, 2006.
International Preliminary Report on Oct. 26, 2006 Patentability for international Patent Application No. PCT/US2004/038705, mailed Oct. 26, 2006.
International Preliminary Report on Patentability for international Patent Application No. PCT/US2004/038707, mailed Aug. 10, 2006.
International Search Report for International Patent Application No. PCT/US2004/038704, mailed Jul. 7, 2005.
Office Communication for U.S. Appl. No. 10/863,926, mailed Oct. 13, 2010.
Office Communication for U.S. Appl. No. 11/314,201, mailed May 20, 2009.
Office Communication for U.S. Appl. No. 11/314,201, mailed Feb. 26, 2009.
Office Communication for U.S. Appl. No. 10/946,630, mailed Jul. 6, 2010.
Office Communication for U.S. Appl. No. 10/946,630, mailed Sep. 14, 2010.
International Preliminary Report on Patentability for International Patent Application No. PCT/US2007/070525, mailed May 28, 2009.

* cited by examiner

INITIAL IMPRESSION ANALYSIS TOOL FOR AN ONLINE DATING SERVICE

TECHNICAL FIELD

The present invention relates generally to online search services, and more particularly, but not exclusively, to various embodiments for enabling selection and display of initial impression attributes of online search results, such as an online dating search.

BACKGROUND

Dating services are now so popular that by at least one study for the given year, over twenty-six percent of all Internet users in the United States have visited a personals website. Part of the reason may be that online dating may appear to be a natural extension of where people are at this point in time. That is, many people today, have personal computers, or at least access to a personal computer. Moreover, virtually everyone wants to fall in love. Thus, it is natural to merge these two things. As such, online dating services may appear as the world's biggest singles bar. Except that it can be done in the privacy of one's own home where time may be taken to read about another person and get to know them through email, phone, and the like, before ever going on an actual date.

While online dating has made it much easier to 'screen' potential partners, it remains a complicated and sometimes overwhelming activity. A user of such online dating services must often review large quantities of information about the assets, interests, and background material for numerous candidates. Much of this information may be organized based on general web standards, or how the online dating service might prefer to display it. However, just as each potential partner may be different, so too, is what a user might want to know about the potential partner. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
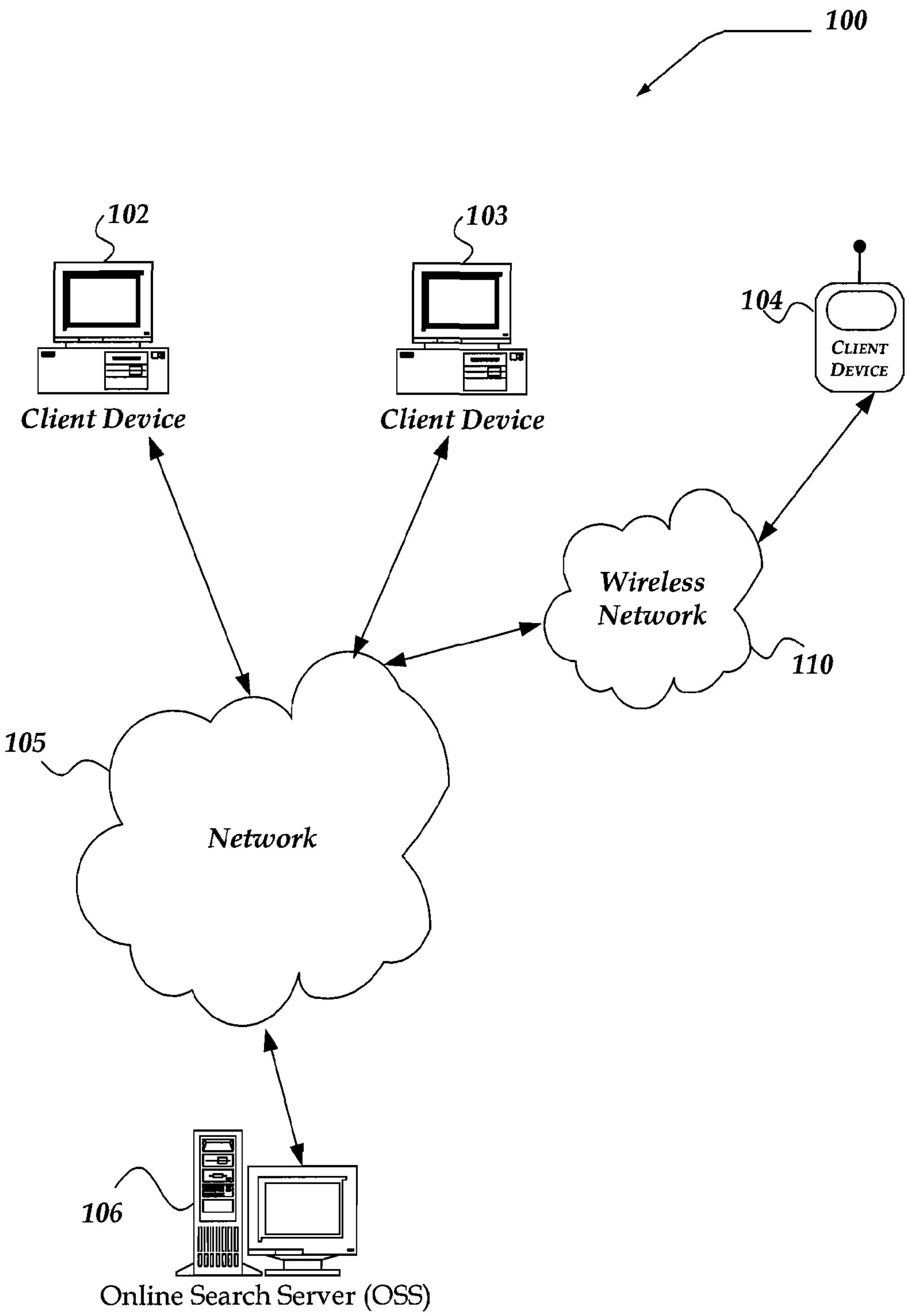
FIG. 1 shows a block diagram illustrating one embodiment of an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the present invention is directed towards managing a display of initial impression attributes, sometimes called first impression attributes. In one embodiment, the initial impression attributes may be employed within a search context. For example, a user may be presented with search criteria from which to perform the search. In one embodiment, the search is performed within a context of online dating services. However, the invention is not so limited, and other types of contexts may be employed. For example, a display of initial impression attributes during a browsing context for merchandise, social networking groups to join, employment, or any of a variety of other contexts where a user may want to perform a quick comparison of a result's attributes.

The user may select to perform a search, perform browsing, or modify the set of initial impression attributes to be displayed. If the user does not select a set of initial impression attributes, a default set may be provided. In one embodiment, the user may, at virtually any time, modify the displayed set of initial impression attributes. In one embodiment, the set of initial impression attributes may be persistent, that is, until the user selects to modify them. In one embodiment, the set of initial impression attributes is a subset of attributes selected from within the search criteria, or other analysis criteria. In one embodiment, when a result of the search (or other analysis, or browsing) is displayed, the set of initial impression attributes may be displayed in a prominent location such that the user may quickly review the initial impression attributes and make a decision based, in part, on the initial impression attributes, rather than having to examine additional details about the displayed results or open another page for more detail. In another embodiment, a mechanism may be provided to enable selectively displaying of the initial impression attributes.

In one embodiment, the set of initial impression attributes may be also be provided to the user through a variety of contexts, including in close proximity to an email thread, within an email that may include potential search results, or any of a variety of other contexts. Thus, for example, in one embodiment, when a user is participating in a threaded online conversation, the set of initial impression attributes may be displayed or made readily available for display to the user, such as through a hyperlink to the set of initial impression attributes.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, wireless network 110, and online search server (OSS) 106. Network 105 is in communication with and enables communication between each of client devices 102-103 and OSS 106. Wireless network 110 is in communication with network 105 and enables communication between client device 104 and, by way of network 105, client devices 102-103 and OSS 106.

Generally, client devices 102-104 may include virtually any computing device capable of receiving and sending a message over a network, such as network 105, wireless network 110, or the like, to and from another computing device, such as OSS 106, each other, or the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-104 also may be any computing device that is capable of connecting using a wired or wireless communication medium such as a PDA, POCKET PC, laptop computer, wearable computer, mobile phone and any other device that is equipped to communicate over a wired and/or wireless communication medium.

Client devices 102-104 may include a browser application that is configured to receive and to send web pages, web-based messages, and the like. The browser application may be configured to receive and display graphics, text, multimedia, and the like, employing virtually any web based language, including Standard Generalized Markup Language (SMGL), HyperText Markup Language (HTML), eXtensible Markup Language (XML), and so forth.

Client devices 102-104 may further include a client application that enables it to perform a variety of other actions, including, communicating a message, such as through a Short Message Service (SMS), Multimedia Message Service (MMS), instant messaging (IM), internet relay chat (IRC), Mardam-Bey's IRC (mIRC), Jabber, and the like, between itself and another computing device. The browser application, and/or another application, such as the client application, a plug-in application, and the like, may enable client devices 102-104 to communicate content to another computing device.

Client device 104 represents one embodiment of a computing device that is configured to be portable. Thus, client device 104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client device 104 typically ranges widely in terms of capabilities and features. For example, a cell phone may have a numeric keypad and a few lines of monochrome LCD display on which only text may be displayed. In another example, a web-enabled remote device may have a touch sensitive screen, a stylus, and several lines of color LCD display in which both text and graphics may be displayed. Moreover, the web-enabled remote device may include a browser application enabled to receive and to send wireless application protocol messages (WAP), and the like. In one embodiment, the browser application is enabled to employ a Handheld Device Markup Language (HDML), Wireless Markup Language (WML), WMLScript, JavaScript, XML, and the like, to display and send a message.

Client device 104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, client device 104 may uniquely identify itself through any of a variety of mechanisms, including a phone number, Mobile Identification Number (MIN), an electronic serial number (ESN), Mobile Subscriber Integrated Services Digital Network (MS-ISDN), or other mobile device identifier.

Client device 104 may also be configured to communicate a message, such as through a SMS, MMS, IM, IRC, mIRC, Jabber, and the like, between itself and another computing device, such as OSS 106, or the like. However, the present invention is not limited to these message protocols, and virtually any other message protocol may be employed.

Client devices 102-104 may be further configured to enable a user to participate in an online dating service, manage personal user information associated with the online dating service, and the like, which may in turn be saved at a location, such as OSS 106, and the like. Client devices 102-104 may also be configured to enable a user to perform any of a variety of other searches, beyond online dating searches. As such, client devices 102-104 may further include a client application that is configured to manage various actions on behalf of the client device. For example, the client application may enable a user to interact with the browser application, email application, and the like, to manage their online dating information, or other search information. For example, within online dating search contexts, the user may employ the client application, in part, to create a user profile, participate in an online dating personality analysis, such as a personality type and love styles test, a relationship test, and the like. The client application may further enable the user to receive and interact with results of a search that is based, at least in part, on the user's input to the online dating service. Moreover, the client application further enables the user to interact with the online dating service results of the search, and to provide actions that may then be used to automatically revise the search results. Such interactions may include skipping various candidate profiles, selecting for viewing a candidate's profile, saving a candidate's profile, or other personalized actions.

The client application may also enable the user to receive and modify a set of initial impression attributes or first impression attributes associated with the search. Such initial impression attributes may then be displayed in conjunction with a search results. By enabling the user to select and view those initial impression attributes of particular interest to the user, the user is enabled to quickly determine whether the search result is of interest. The set of initial impression attributes may be selectively displayed, such that they may be always visible with the search results, visible after the user specially selects to view it, visible only on a search result having a predefined relevancy rating, or even any combination of these factors. Others selection criteria may also be employed to determine when to display the initial impression attributes, without departing from the scope of the invention.

Wireless network 110 is configured to couple client device 104 and its components with network 105. Wireless network 1 10 may include any of a variety of wireless sub-networks that may further overlay stand-alone ad-hoc networks, and the like, to provide an infrastructure-oriented connection for client device 104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 2.5G, 3rd (3G) generation radio access for cellular systems, WLAN, Wireless Router (WR) mesh, and the like. Access technologies such as 2G, 2.5G, 3G, and future access networks may enable wide area coverage for mobile devices, such as client device 104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between client device 104 and another computing device, network, and the like.

Network 105 is configured to couple OSS 106 and its components with other computing devices, including, client devices 102-103, and through wireless network 110, client device 104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of OSS 106 is described in more detail below in conjunction with FIG. 2. Briefly, however, OSS 106 may include any computing device capable of connecting to network 105 to enable a user of at least one of client devices 102-104 to manage their searching activities and related set of initial impression attributes. Devices that may operate as OSS 106 include personal computers desktop computers, multiprocessor systems, microprocessor-based or programmable consumer electronics, network PCs, servers, and the like.

It is noted that while FIG. 1 illustrates a single computing device operable as OSS 106, the invention is not so limited. For example, the actions attributable to OSS 106 may be distributed across multiple computing devices, such as a group of servers, a network cluster, and the like, without departing from the scope or spirit of the invention.

Illustrative Server Environment

Figure 2:
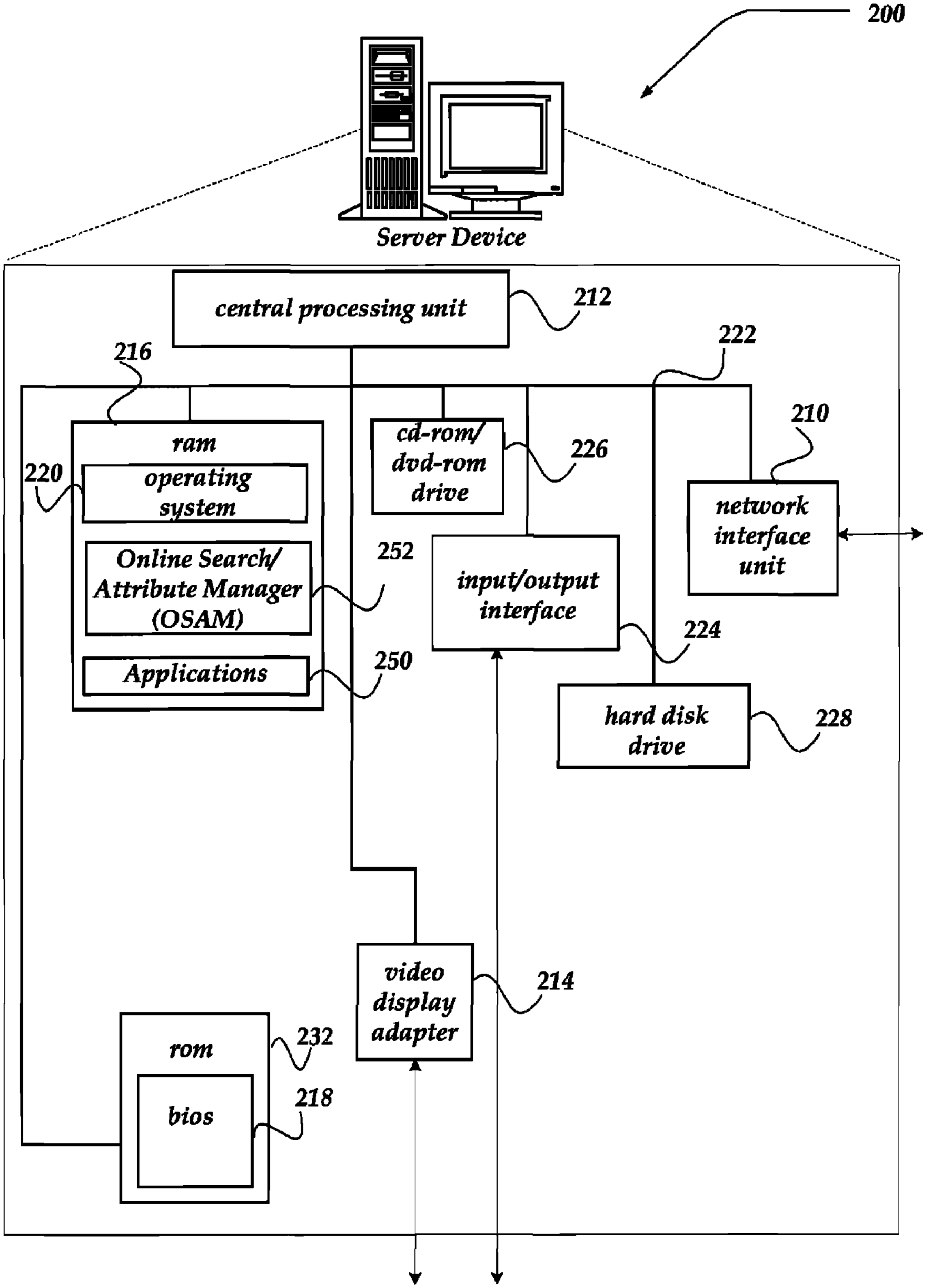
FIG. 2 shows one embodiment of a server device that may be included in a system implementing the invention.

FIG. 2 shows one embodiment of a server device, according to one embodiment of the invention. Server device 200 may include many more components than those shown. The components shown, however, are sufficient to disclose an illustrative embodiment for practicing the invention. Server device 200 may be employed as one embodiment of OSS 106 of FIG. 1.

Server device 200 includes processing unit 212, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server 102. As illustrated in FIG. 2, server device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

Server device 200 may also include an SMTP handler application for transmitting and receiving email. Server device 200 may also include an HTTP handler application for receiving and handing HTTP requests, and an HTTPS handler application for handling secure connections. The HTTPS handler application may initiate communication with an external application in a secure fashion.

Server device 200 also includes input/output interface 224 for communicating with external devices, such as a mouse, keyboard, scanner, or other input devices not shown in FIG. 2. Likewise, server device 200 may further include additional mass storage facilities such as hard disk drive 228. Hard disk drive 228 is utilized by server 102 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may further include applications such as Online Search & initial Attribute Manager (OSAM) 252.

OSAM 252 enables a user to manage their online search information, communicate with other users, and non-users, and to generally pursue online search activities. OSAM 252 provides a variety of features to enable a user of a client device to participate in the online search experience. In one embodiment, OSAM 252 is configured to automatically modify, for example, an online service's search results based on personalization inputs.

For example, in an online dating service context, OSAM 252 may enable a user to provide information about him/her self by answering a series of questions, including questions about their personality and relationship compatibilities, and optionally other social aspects associated with the user. In one embodiment, OSAM 252 may enable the user to take various tests. The results of these tests may be employed in the search for candidates of a potentially long term relationship with the user. For example, OSAM 252 may allow the user to participate in a personality type and love style test or in a relationship test. However, the invention is not so limited, and other tests may be employed without departing from the scope or spirit of the invention. Moreover, in different search contexts, such as, for example, employment searches, similar types of information, questions, testing, or the like, may also be provided by OSAM 252. In addition, OSAM 252 may employ additional information about the user, user's activities, relationships, or the like, to perform the search for the user.

OSAM 252 may further allow the user to select from a list of various criteria from which to perform a search. For example, within the online dating search contexts, the list of various criteria may include various features the user may prefer, such as height, weight, hair color, a smoking preference, a drinking preference, interests, political interests, religious interests, education, employment, or virtually any of a number of other possible online dating criteria. In one embodiment, OSAM 252 may allow the user to identify one or more of the various criteria as "must have" criteria. Thus, for example, the user may decide that the results of the search must include only non-smokers, or the like.

OSAM 252 may employ the results of the selected search criteria and, if available, testing inputs, to generate a set of unified search criteria. The unified search criteria may then be employed to perform a search on one or more data stores to identify possible results matching, or most closely matching the provided unified search criteria.

Because there may a large number of criteria employed by OSAM 252 in performing the search, OSAM 252 further provides the user with a subset of the search criteria from which the user may display as a set of initial impression attributes. In one embodiment, the set of initial impression attributes may be determined for the user by OSAM 252, as described in more detail below. In one embodiment, the user may select the set of initial impression attributes. Such attributes may then be selectively displayed in conjunction with each search result, be selectively displayed by the user for a given search result, or the like, based on any of a variety of criteria. Embodiments of screen shots of interfaces useable in customizing the set of initial impression attributes to be selectively displayed are described in more detail below in conjunction with FIGS. 6, and 7A-7B.

In some searches, a resulting profile may be associated with its own search criteria. For example, with respect to online dating searches, the potential candidate may have preferences that that person seeks. For example, the potential candidate may be seeking a person that loves children, loves pets, or any of a variety of other preferences, must haves, or the like. Thus, in one embodiment, OSAM 252 enables a selective display of the initial impression attributes to also include a corresponding set of attribute criteria for the search result. Thus, in one embodiment, OSAM 252 may display two dimensions of information about each topic, information describing the search result (sometimes called the poster), and information associated with that which the poster seeks. By displaying both perspectives, the search user is provided with the flexibility to simultaneously check the attributes the user seeks and at the same time, assure that they fit the expectations of the search result (poster). One example of displaying a two dimensional set of initial impression attributes with the search results is described in more detail below in conjunction with FIG. 5. Moreover, OSAM 252 may employ processes such as described below in conjunction with FIGS. 3-4 to perform at least some of its actions.

Although the above describes OSAM 252 as a single application, configured to perform searches and manage initial impression attributes, the invention is not so limited. For example, in another embodiment, such functions may be distributed across multiple applications. Moreover, these functions may also be distributed across multiple computing devices, without departing from the scope of the invention.

Generalized Operation

Figure 3:
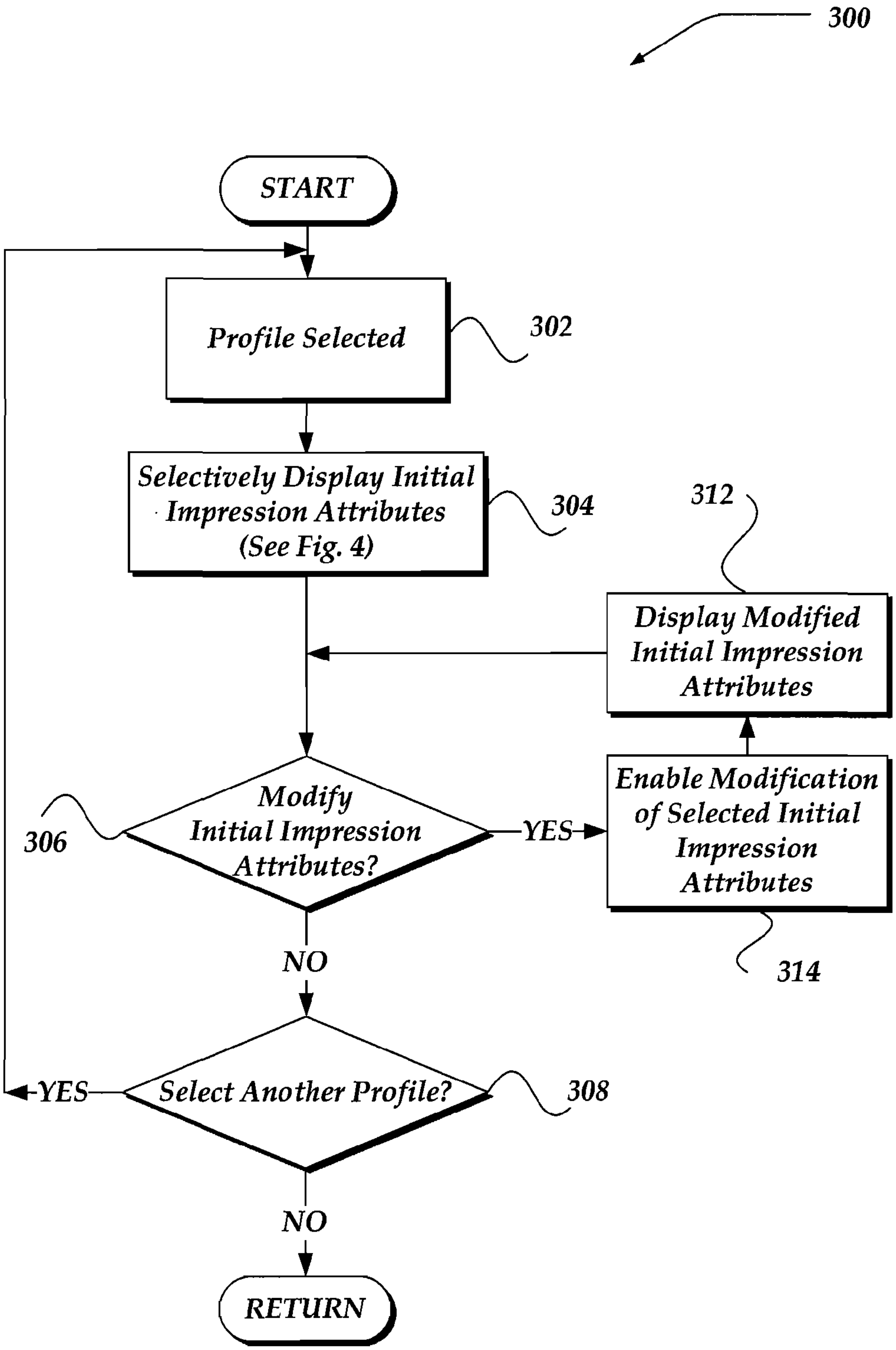
FIG. 3 illustrates a logical flow diagram generally showing one embodiment of a process for managing a selection and display of initial impression attributes for a search result.

The operation of certain aspects of the invention will now be described with respect to FIGS. 3-4. FIG. 3 illustrates a logical flow diagram generally showing one embodiment of a process for managing a selection and selective display of initial impression attributes for comparisons.

Figure 5:
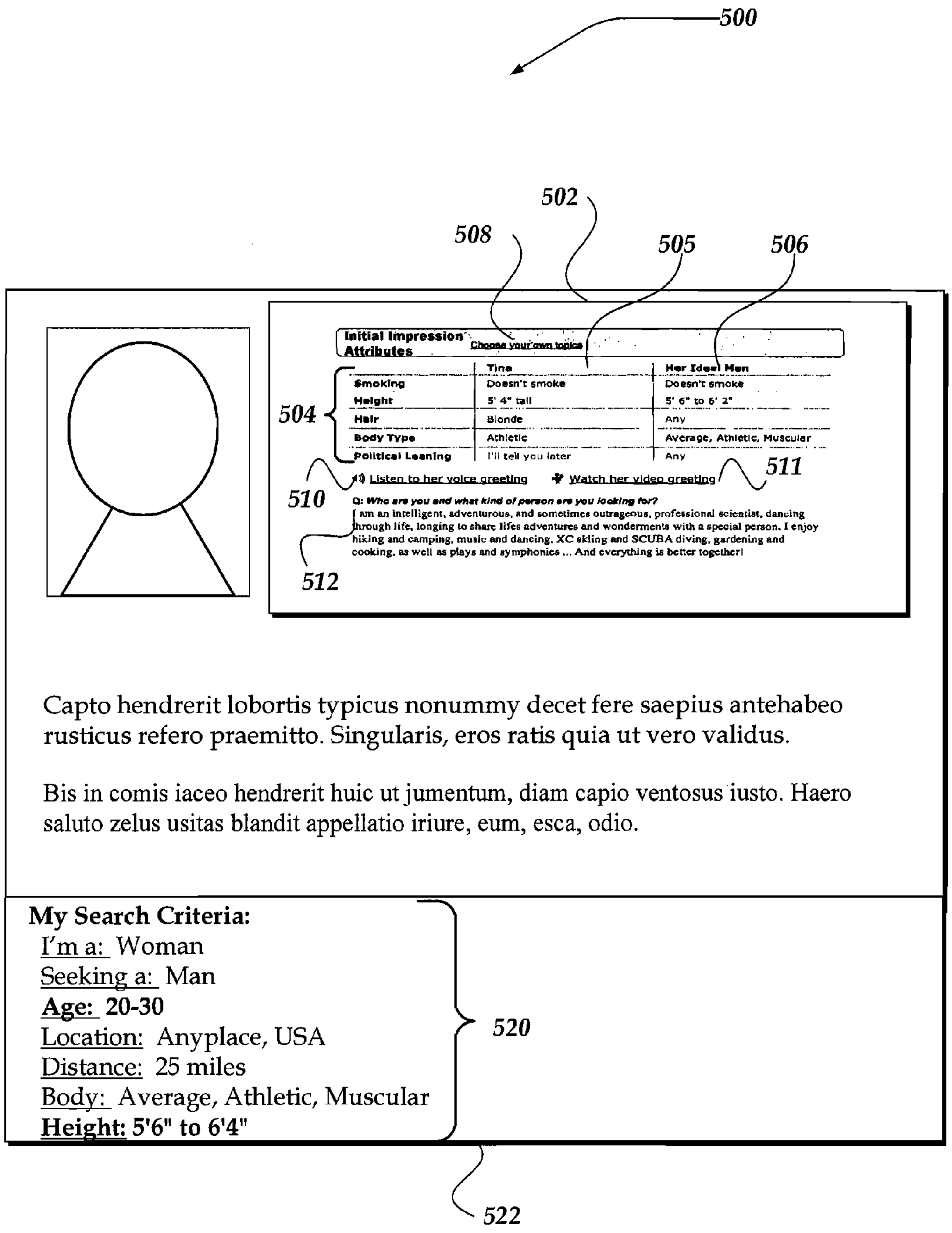
FIG. 5 illustrate one embodiment of a screen shot of an online dating profile with initial impression attributes.

Process 300 of FIG. 3 may be implemented, for example, within OSS 106 of FIG. 1. In one embodiment, a user of a client device, such as client devices 102-104 may interact with OSS 106 to select and modify initial impression attributes for comparisons. As described below, a search result may be organized into one or more profiles, one embodiment of which is illustrated in FIG. 5 for an online dating search. However, the invention is not limited to accessing an interface for use in modifying initial impression attributes through a profile screen, and other mechanisms may also be used. For example, the interface for use in modifying initial impression attributes may also be accessed through an icon, pull-down menu, push button, or any of a variety of other selection mechanisms.

As shown, however, process 300 begins, after a start block, at block 302 where a profile may be selected. Included with the profile, or otherwise associated with the profile is a selective display of initial impression attributes. In one embodiment, the initial impression attributes may be displayed in a prominent position over, on within the profile. In one embodiment, a hyperlink, or other selectable mechanism may be included that enables the user to select and display the initial impression attributes.

Processing proceeds to block 304, where the initial impression attributes may be displayed. In one embodiment, the displayed attributes may be selected for display based on a variety of criteria, such as described in more detail below in conjunction with FIG. 4. In any event, upon display of an interface of initial impression attributes, the process flows to decision block 306, where the user may select to modify one or more of the attributes that are to be selectively displayed. If the user so selects to modify the set of initial impression attributes, processing flows to block 314; otherwise, processing flows to decision block 308.

At block 314, the user may be presented with any of a variety of mechanisms useable to select and modify the initial impression attributes. Embodiments of different interface mechanisms for selecting/modifying the initial impression attributes are described in more detail below in conjunction with FIGS. 7A-7B. In any event, the user may modify the initial impression attributes by selecting those that the user wants selectively displayed, and/or deselecting others. In one embodiment, the user may reorder the set of initial impression attributes. Processing flows next to block 312 where the modifications may be displayed to the user. The process loops through decision block 306, and blocks 314 and 312, until the user indicates that no more initial impression attributes are to be modified.

Process 300 then flows to decision block 308, where the user may select another profile. If the user selects another profile to view, processing flows to block 302, where the selected profile is displayed; otherwise, processing returns to a calling process to perform other actions.

Figure 4:
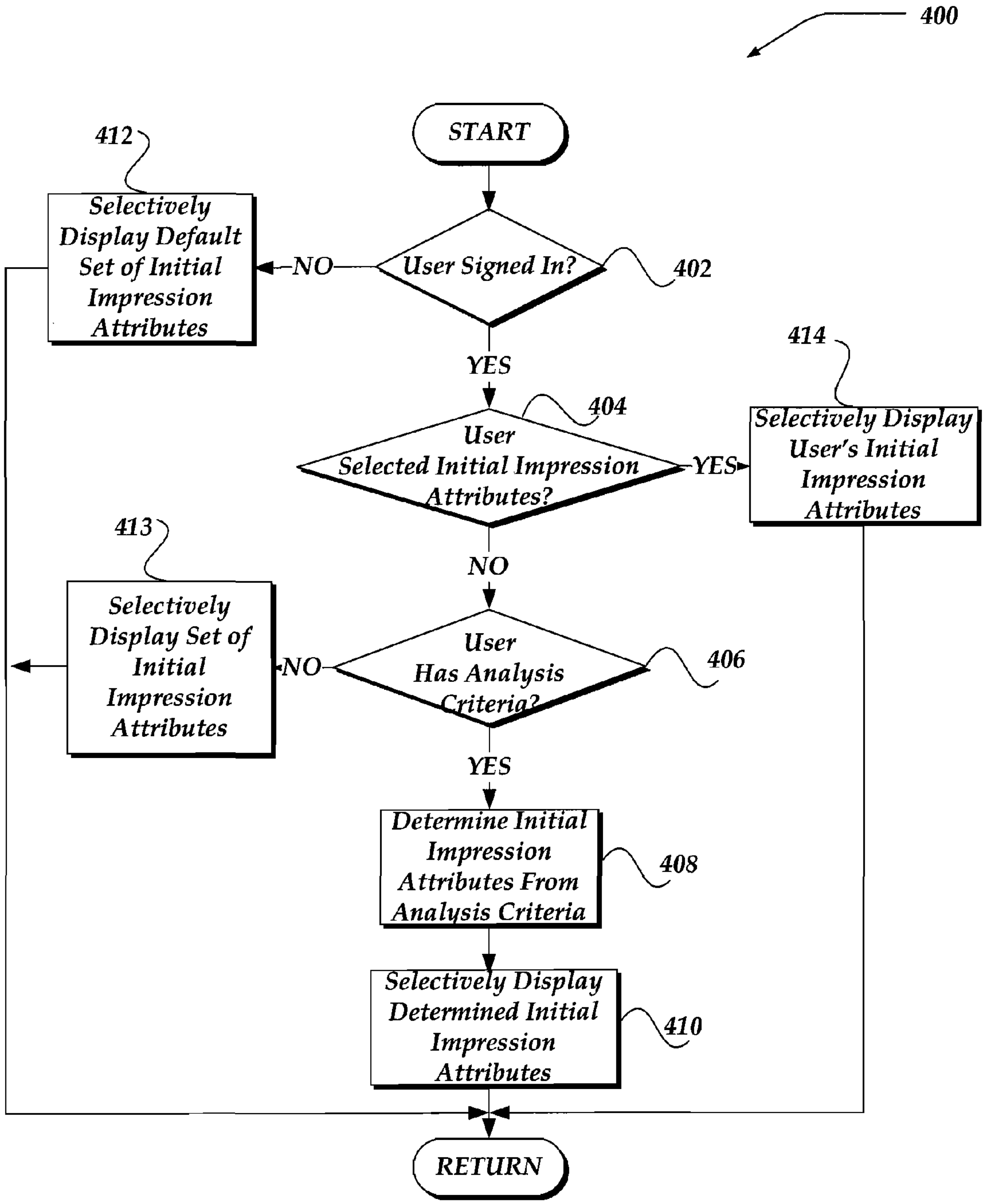
FIG. 4 illustrates a logical flow diagram showing one embodiment of a process for selecting for display initial impression attributes for use in providing an initial first impression of a search result.

FIG. 4 illustrates a logical flow diagram showing one embodiment of a process for selecting for display the initial attributes for use in providing an initial first impression of a search result. In one embodiment, process 400 of FIG. 4 may be called at block 304 of FIG. 3.

As shown, process 400 begins, after a start block, at decision block 402, where a determination is made whether the user is signed into an account, or other mechanism that enables recognition of the user. Such signing in may or may not employ a password mechanism. Thus, any of a variety of mechanisms may be employed that enables recognition of the user, including, for example, employing a mobile device identifier, a network identifier, or the like, that may be associated with the user. In any event, if the user is not signed in, or otherwise, recognized, processing flows to block 412. However, if the user is recognized, either by signing in, or otherwise providing a recognition identifier, processing flows to decision block 404.

At block 412, a default set of initial impression attributes may be displayed, or otherwise made available, to the user. In one embodiment, the default set of initial impression attributes may be made available to the user through a hyperlink, icon, or other selectable mechanism. Any of a variety of default set of initial impression attributes may be provided. For example, in one embodiment, a default set may be determined based on a statistical analysis of one or more users. Based on the statistical analysis, a set of common or more often selected set of initial first impression attributes may be determined. This set may then be provided to the user.

In another embodiment, the default set of initial impression attributes may be determined based on a dynamically changing set of determined criteria reflecting a set of most often employed criteria, over a time period, for a particular gender, a defined product, or the like.

In still another embodiment, the default set of initial impression attributes may be determined based on a set of initial impression attributes provided by one or more posters of the attributes. For example, in the online dating example, the set of initial impression attributes may be based on what one or more poster's of a profile indicates as their initial impression attributes, must have criteria, or the like. Thus, as noted, the set of initial impression attributes may be based on any of a variety of criteria, without departing from the scope of the invention. In any event, processing then flows from block 412, to return to a calling process to perform other actions.

At decision block 404, however, where the user is recognized, such as through a sign in mechanism, a determination is made whether the user has already selected a set of initial impression attributes. This may arise, for example, where the user has already employed a process such as described above, in FIG. 3, or the like. In any event, if the user has already selected a set of initial impression attributes, processing proceeds to block 414; otherwise, processing flows to decision block 406.

At block 414, the user's selected initial impression attributes may have been stored in a data store, or the like. As such, the stored initial impression attributes may be retrieved using, for example, the user's recognition identifier, or the like. Processing may then return to the calling process to perform other actions.

At decision block 406, however, a determination is made whether the user has provided analysis criteria. Such analysis criteria may include, for example, online search criteria, product browsing criteria, job analysis criteria, or the like. If so, processing may proceed to block 408; otherwise, processing may branch to block 413, to select a set of initial impression attributes. For example, in one embodiment, the set of initial impression attributes may include a default set of initial impression attributes, such as described above in conjunction with block 412. However, the set of initial impression attributes may also be selected from a variety of other mechanisms. For example, in one embodiment, the set may be selected by observing preference patterns from browsing or searching activities by the user, or other users, and employing a set of initial impression attributes based on the observations. In another embodiment, the set of initial impression attributes may be selected based on a combination of user's known demographic information, derived from a profile of the user, or programmatically traced from an address location and/or cookies, or the like, stored on the user's computer. However, the invention is not limited to these selection mechanisms, and others may also be employed. In any event, upon completion of block 413, processing returns to a calling process to perform other actions.

At block 408, the user's search criteria may be employed to determine a set of initial impression attributes for the user. For example, in one embodiment, if the user has provided 'must have' type of search attributes in their search criteria, such 'must have' attributes may be used, in whole or in part, to determine the user's set of initial impression attributes. Where the user has provided few or no 'must have' search criteria, in one embodiment, the user's selected preferences for the search criteria, if any, may be used to determine the user's set of initial impression attributes. Thus, for example, in the online dating example, the user may have identified no smoking is preferred, but not a 'must have' criteria. Such preferences may then be used to determine the user's set of initial impression attributes. A user's set of initial impression attributes may also be determined, in whole or in part, by analysis of browsing, or communication habits. If a user, for example, tends to primarily contact non-smokers, a determination may be made that smoking habits are important. Moreover, thus it may be indicated that non-smokers are more preferred. However, the invention is not constrained to these mechanisms, and virtually any other mechanism may be used to determine the user's set of initial impression attributes based, in part, on provided search criteria by the user. In any event, upon determining the set of initial impression attributes, processing flows to block 410, where the set may be displayed or otherwise made available for display. Processing then returns to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Figure 6:
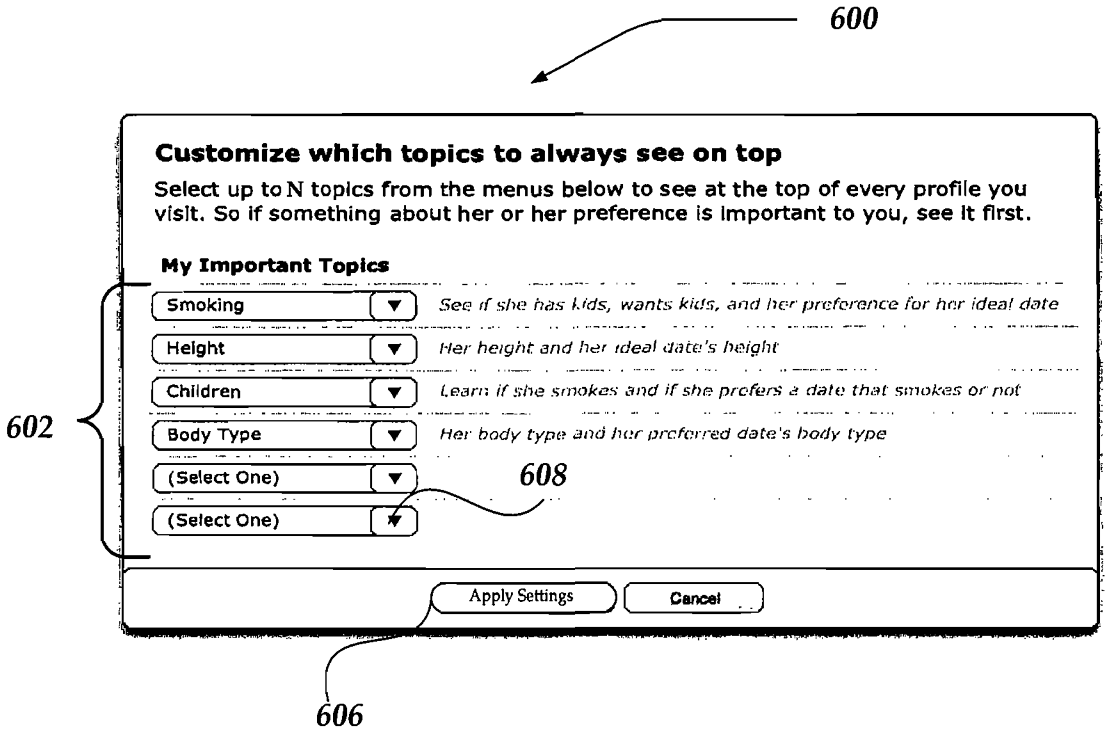
FIGS. 6 and 7A-7B illustrate various embodiments of screen shots for use in modifying the set of initial attributes for use in providing an initial first impression of a search result.
Figure 7A:
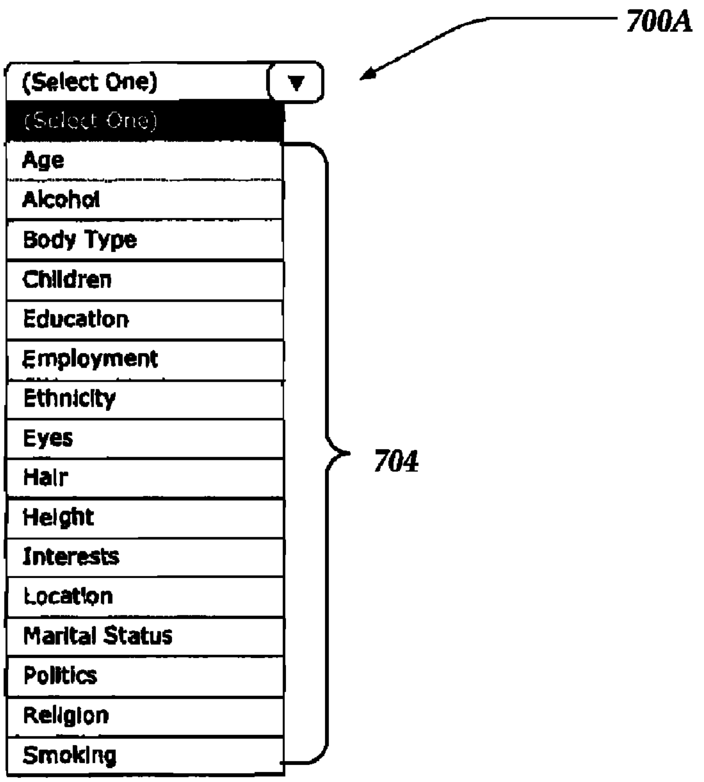
Figure 7B:
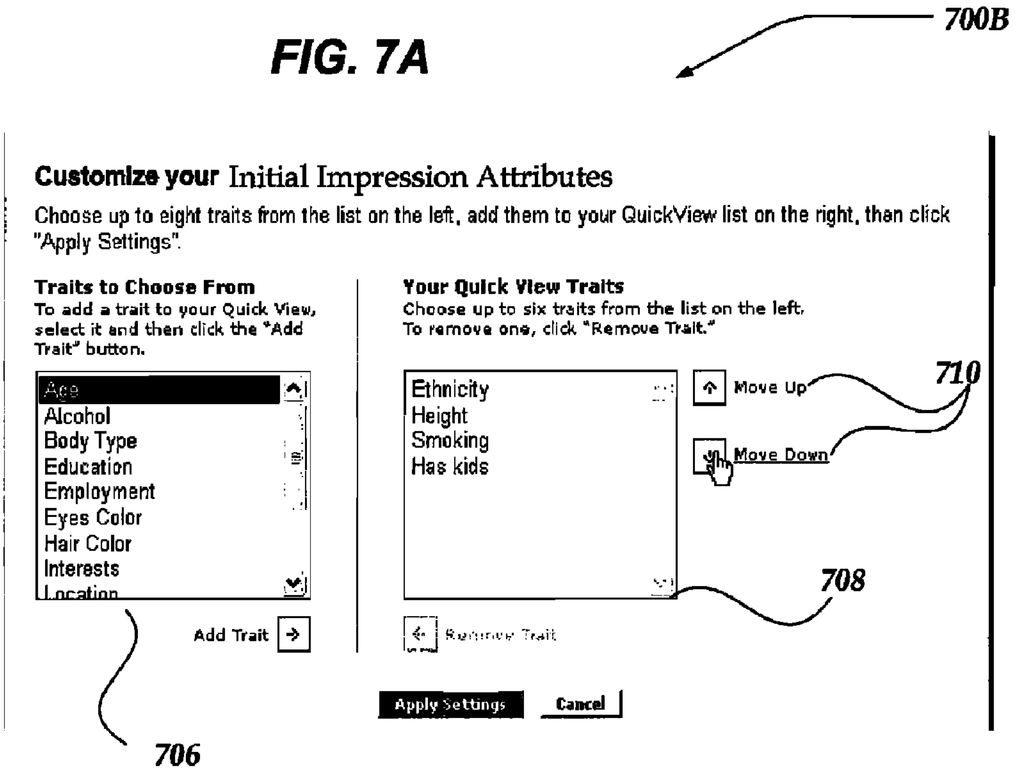

FIG. 5 illustrates one embodiment of a screen shot of an online dating profile with initial impression attributes, while FIGS. 6 and 7A-7B illustrate various embodiments of screen shots for use in modifying the set of initial impression attributes for use in providing a first impression of a search result. Although the FIGURES refer to online dating search results, the invention is clearly not so limited. Online dating is employed herein merely to readily demonstrate embodiments using and/or modifying the set of initial impression attributes.

Thus, as illustrated in FIG. 5, screen shot 500 represents one embodiment of an online dating profile. Within screen shot 500 is a frame 502 showing initial impression attributes 504. As shown, two sets of attribute criteria may be displayed side by side for the initial impression attributes 504, or in virtually any other arrangement. The two sets include result's attributes 505 and the results attribute criteria 506. Thus, for example, the searcher may have selected for display smoking, height, hair, body type, and political leaning, as the initial impression attributes. The result's attributes 505 represent the results associated with the currently displayed profile, in this example, whether the profiled results (for a candidate date) smokes, their height, hair color, body type, and political leaning. Moreover, the result's attribute criteria 506 represent what the candidate date is looking for (e.g., their search criteria) for the initial impression attributes 504. By displaying such information, the searcher may more quickly make a determination whether the profiled candidate warrants a more extensive evaluation. Where the searcher so determines to examine the profiled candidate, the search may read, more about what the profiled candidate may have to say, read the profiled candidates search criteria 520 more extensively, or even, listen to a voice greeting 510, watch a video 511 by the profiled candidate, read a quick response to a predetermined question 512, or the like. However, question512 may be composed of prose, images, and/or any other element that helps convey the essence of the candidate nature clearer than a closed-ended response may convey. Thus, question 512 may be replaced or complemented by a variety of other elements, without departing from the scope of the invention.

As noted above, the set of initial impression attributes 504, and side by side comparisons of result's attributes 505 and the result's attribute criteria 506 may be displayed with a selected profile, or selectable using a hyperlink, an icon, or other mechanism.

Also illustrated, should the searcher so decide, they may select to modify the set of initial impression attributes. This may be performed, for example, by selecting a link 508, or employing any of a variety of other selection mechanisms.

In one embodiment, when the searcher selects to modify the set of initial impression attributes, a menu 600 of FIG. 6, or similar screen, may be displayed. In one embodiment, menu 600 may be displayed over another window, such as a profile illustrated in screen shot 500 of FIG. 5.

As shown in FIG. 6, in one embodiment, menu 600 enables the searcher to select from a variety of initial impression attributes 602, by selecting a pull down an arrow 608. For example, as shown in FIG. 7A, selection of pull down arrow 608 on FIG. 6, may provide a menu 700A of selectable initial impression attributes 704, from which the searcher may select.

FIG. 7B illustrates another embodiment of a mechanism 700B useable to select and/or modify the set of initial impression attributes. As shown, the searcher may select from a list 706 and drag, click, or otherwise select an attribute as an initial impression attribute 708. Moreover, the searcher may be permitted to rank order the set of initial impression attributes using a mechanism such as move up/down icons 710, or the like. Thus, as FIGS. 6, 7A, and 7B indicate, any of a variety of mechanisms may be employed to enable the searcher to select and/or modify the set of initial impression attributes.

Although the above discussions have been directed to search result examples, displayed to the searcher, display of set of initial impression attributes may also be provided in any of a variety of other situations. Thus, for example, a search tool may be configured to provide search results to the searcher using a mailing mechanism, such as email, or the like. In this embodiment, the set of initial impression attributes may also be provided or otherwise made accessible in the email.

In another example, a participant to a threaded conversation may be provided a set of initial impression attributes associated with another participant to the threaded conversation. Thus, in one embodiment, the set of initial impression attributes may be displayed in close proximity to a profile abstraction, or the like, so that messages with the threaded conversation from other participants can be evaluated based not only on the content of the message, but how well the set of initial impression attribute topics meet a participant's expectations. Again, the set of initial impression attributes may be made always visible, visible after the participant selects them for display, visible based on the other participant's criteria meeting a defined relevancy rating to the participant, or any of a variety of other factors.

The above specification, examples, and data provide a complete description of the manufacture and use of the com-position of the invention. Since many embodiments of the invention can be made without departing from the spirit and scope of the invention, the invention resides in the claims hereinafter appended.

What is claimed as new and desired to be protected by Letters Patent of the United States is:

1. A method of managing an online comparison of a plurality of candidates with at least one processor that performs actions, comprising:

determining a user's search criteria for an online candidate;

receiving from the user at least one initial impression attribute from the user's search criteria, the at least one initial impression attribute being selected by the user for display within each online candidate profile displayed as a result of a user's search;

displaying at least one candidate profile using the user's search criteria;

further displaying concurrently within the at least one candidate profile at least one result attribute based on the user selected at least one initial impression attribute such that the user is enabled to assess the candidate based, in part, on a comparison of the at least one result attribute to the at least one user selected initial impression attribute, wherein displaying the at least one result attribute further comprises displaying two sets of result attributes, wherein a first set of the result attributes represents those attribute results associated with a current displayed candidate profile and a second set of result attributes represents what the candidate for the currently displayed profile is looking for, for the at least one result attribute, and wherein the result attributes are selected for display by the user; and receiving at least one additional initial impression attribute based on a default set of initial impression attributes based on analysis of a user's communication and browsing behavior, the additional initial impression attribute being subsequently modified by another user selection.

2. The method of claim 1, further comprising receiving at least one additional initial impression attribute based on a default set of initial impression attributes determined from an analysis of other user's selections of initial impression attributes, the additional initial impression attribute being subsequently modified by another user selection.

3. The method of claim 1, further comprising receiving at least one additional initial impression attribute based on a default initial impression attribute in part, determined from the user specifying at least one of a must have user's search criteria, or a preferred user's search criteria, the additional initial impression attribute being subsequently modified by another user selection.

4. The method of claim 1, wherein selectively displaying the at least one result attribute further comprises providing a user selection mechanism with the displayed at least one candidate profile.

5. The method of claim 1, further comprising: enabling the user to modify the at least one initial impression attribute by, in part, enabling the user to select another initial impression attribute from the user's search criteria for display, or to deselect at least one initial impression attribute currently selected for display.

6. A computer-readable storage medium configured to include program instructions for performing the method of claim 1.

7. The method of claim 1, wherein the candidate profile is further associated with at least one of an online search result, or a webpage browsing.

8. A client device for displaying search results, comprising:

a display; and a processor in communication with the display and that includes instructions that causes the processor to perform a plurality of operations, including:

enabling a user to provide search criteria for a candidate for an online search;

enabling the user to select for display at least one initial impression attribute from the search criteria;

initiating a search for a list of candidates employing the search criteria;

displaying at least one candidate profile for the candidate from the list of candidates;

further displaying with the at least one candidate profile at least one result attribute corresponding to the at least one user selected for display initial impression attribute such that the user is enabled to assess the candidate associated with the candidate profile based, in part, on the online comparison of the at least one result attribute to the at least one user selected initial impression attribute, wherein displaying the at least one result attribute further comprises displaying two sets of result attributes, wherein a first set of the result attributes represents those attribute results associated with a current displayed candidate profile and a second set of result attributes represents what the candidate for the currently displayed profile is looking for, for the at least one result attribute, and wherein the result attributes are selected for display by the user; and receiving at least one additional initial impression attribute based on a default set of initial impression attributes based on analysis of a user's communication and browsing behavior, the additional initial impression attribute being subsequently modified by another user selection.

9. The client device of claim 8, wherein displaying the at least one candidate profile further comprises displaying the at least one candidate profile within an email.

10. The client device of claim 8, wherein the candidate further comprises a candidate from an online dating service, a product, an interest or community group, real estate or an employment position.

11. The client device of claim 8, wherein selectively displaying the at least one result attribute further comprises at least one of displaying the at least one result attribute for each candidate profile, providing a selection mechanism for selectively displaying the at least one result attribute for the at least one candidate profile, or displaying the at least one result attribute based on a search result for each candidate in the list of candidates exceeding a predefined relevancy rating.

12. The client device of claim 8, wherein displaying at least one candidate profile from the list of candidates further comprises displaying the at least one candidate profile within a threaded conversation, and wherein selectively displaying the at least one result attribute further comprises enabling the user to display the at least one result attribute with the at least one candidate profile within the threaded conversation.

13. A server device for managing online search results, comprising:

a transceiver for receiving and sending information to another computing device;

a processor in communication with the transceiver; and a memory in communication with the processor for storing data and machine instructions that cause the processor to perform a plurality of operations, including:

receiving from a user at least one user-selectable initial impression attribute from a search criteria for display within each resulting candidate profile;

performing a search for a list of candidates employing the search criteria;

displaying a candidate profile for a candidate within the list of candidates;

selectively displaying at least one result attribute from the candidate profile, wherein the at least one result attributed is associated with the at least one candidate profile and the at least one user selected initial impression attribute for display within the candidate profile, the at least one result attribute is concurrently displayed within the displayed candidate profile such that the user is enabled to evaluate the candidate based, in part, on the online comparison of the at least one result attribute to the at least one user selected initial impression attribute, and wherein selectively displaying the at least one result attribute further comprises displaying two sets of result attributes, wherein a first set of the result attributes represents those attribute results associated with a current displayed candidate profile and a second set of result attributes represents what the candidate for the currently displayed profile is looking for, for the at least one result attribute, and wherein the result attributes are selected for display by the user; and receiving at least one additional initial impression attribute based on a default set of initial impression attributes based on analysis of a user's communication and browsing behavior, the additional initial impression attribute being subsequently modified by another user selection.

14. The server device of claim 13, wherein displaying the candidate profile further comprises displaying the candidate profile within at least one of a threaded conversation, a one or a plurality of candidate profiles within the list of candidates, or an email.

15. The server device of claim 13, wherein receiving the at least one initial impression attribute further comprises:

if the user is unrecognized, providing a default initial impression attribute, wherein the default initial impression attribute is selected based on at least one of a predetermined set of initial impression attributes, a dynamically changing set of initial impression attributes, a set of initial impression attributes determined from behavioral analysis of the user, or a set of initial impression attributes determined from an analysis of other users, wherein the default initial impression attribute is user modifiable by a subsequent user input.

16. The server device of claim 13, wherein receiving the at least one initial impression attribute further comprises receiving a request from the user to modify the at least one initial impression attribute.

17. The server device of claim 13, wherein selectively displaying the at least one user selected initial impression attribute further comprises providing a selection mechanism that enables the user to determine whether to display the at least one initial impression attribute.

18. A system for managing an online comparison, comprising:

a server device configured to perform actions, including:

receiving from a user at least one initial impression attribute;

providing a candidate profile for a candidate from a webpage browsing or an online search; and a client device configured to perform actions, including:

performing at least one of the webpage browsing or the online search;

providing, in part, the analysis criteria;

providing the at least one initial impression attribute as a user-selectable initial impression attribute for display with the candidate profile;

displaying the candidate profile; and selectively displaying at least one result attribute from the candidate profile, wherein the at least one result attribute is associated with the at least one candidate profile and the at least one user selected initial impression attribute for display, the at least one result attribute is concurrently displayed within the displayed candidate profile such that the user is enabled to evaluate the candidate based, in part, on the online comparison of the at least one result attribute to the at least one user selected initial impression attribute, and wherein selectively displaying the at least one result attribute further comprises displaying two sets of result attributes, wherein a first set of the result attributes represents those attribute results associated with a current displayed candidate profile and a second set of result attributes represents what the candidate for the currently displayed profile is looking for, for the at least one result attribute, and wherein the result attributes are selected for display by the user; and receiving at least one additional initial impression attribute based on a default set of initial impression attributes based on analysis of a user's communication and browsing behavior, the additional initial impression attribute being subsequently modified by another user selection.

19. The system of claim 18, wherein determining the at least one initial impression attribute further comprises at least one of determining a default initial impression attribute from the analysis criteria, or receiving a selection of the at least one initial impression attribute from the client device, wherein the default initial impression attribute is subsequently modifiable by a user input.

20. The system of claim 18, wherein selectively displaying the at least one initial impression attribute further comprises enabling the user to select whether to display the at least one initial impression attribute from within a threaded conversation, an email, or a display of a list of candidate profiles.

* * * * *